US011546052B2

(12) United States Patent
Wang et al.

(10) Patent No.: US 11,546,052 B2
(45) Date of Patent: Jan. 3, 2023

(54) BEAM CONFIGURATION AND PARAMETER MANAGEMENT FOR NON-TERRESTRIAL NETWORKS

(71) Applicant: QUALCOMM Incorporated, San Diego, CA (US)

(72) Inventors: Xiao Feng Wang, San Diego, CA (US); Iyab Issam Sakhnini, San Diego, CA (US); Jun Ma, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 17/068,144

(22) Filed: Oct. 12, 2020

(65) Prior Publication Data

US 2021/0119697 A1 Apr. 22, 2021

Related U.S. Application Data

(60) Provisional application No. 62/923,252, filed on Oct. 18, 2019.

(51) Int. Cl.
*H04B 7/185* (2006.01)
*H04W 68/00* (2009.01)
(Continued)

(52) U.S. Cl.
CPC ....... *H04B 7/18589* (2013.01); *H04B 7/1855* (2013.01); *H04B 7/18543* (2013.01);
(Continued)

(58) Field of Classification Search
CPC ............ H04B 7/18589; H04B 7/18543; H04B 7/1855; H04B 7/1853; H04W 56/001;
(Continued)

(56) References Cited

U.S. PATENT DOCUMENTS

2021/0051707 A1 2/2021 Rastegardoost et al.
2022/0030532 A1* 1/2022 Hajir .................. H04B 7/18513
2022/0150818 A1* 5/2022 Li ...................... H04B 7/18539
2022/0159741 A1* 5/2022 Hoang ............. H04W 72/0453

FOREIGN PATENT DOCUMENTS

KR 20200085986 A 7/2020
WO WO-2018230205 A1 12/2018
(Continued)

OTHER PUBLICATIONS

Ericsson (Email Discussion Rapporteur): "Report of Email Discussion [103bis#34] [NR-NTN]", 3GPP Draft, 3GPP TSG-RAN WG2 Meeting #103bis, R2-1817754, 3rd Generation Partnership Project (3GPP), Mobile Competence Centre, 650, Route Des Lucioles, F-06921 Sophia-Antipolis Cedex, France, Nov. 16, 2018 (Nov. 16, 2018), pp. 1-14, XP051481647, 14 Pages, Retrieved from the Internet: URL: http://www.3gpp.org/ftp/tsg%5Fran/WG2%5FRL2/TSGR2%5F104/Docs/R2%2D1817754%2Ezip. Section 2.1.
(Continued)

*Primary Examiner* — Ashley Shivers
(74) *Attorney, Agent, or Firm* — Harrity & Harrity, LLP

(57) ABSTRACT

This disclosure provides systems, methods and apparatus, including computer programs encoded on computer storage media, for managing beam configurations and parameters for non-terrestrial networks. In some implementations, a UE may detect a synchronization signal block (SSB) transmitted by a satellite via a first beam. Aspects of the present disclosure recognize that each beam may be identified by a unique SSB index based at least in part on a time or frequency on which the SSB is received. Thus, the SSB may be identified based on a frequency-domain SSB index or a time-domain SSB index. The UE may further determine one or more wireless communication parameters associated with the first beam. The UE may generate a mapping between the
(Continued)

SSB and the wireless communication parameters associated with the first beam, and thereafter communicate with the satellite using the mapping.

58 Claims, 10 Drawing Sheets

(51) Int. Cl.
 *H04W 56/00* (2009.01)
 *H04W 74/08* (2009.01)
(52) U.S. Cl.
 CPC ....... *H04W 56/001* (2013.01); *H04W 68/005* (2013.01); *H04W 74/0833* (2013.01)
(58) Field of Classification Search
 CPC ........... H04W 68/005; H04W 74/0833; H04W 16/28; H04W 84/06
 See application file for complete search history.

(56) References Cited

FOREIGN PATENT DOCUMENTS

WO WO-2020135695 A1 7/2020
WO WO-2021063176 A1 * 4/2021 ............... H04B 7/01

OTHER PUBLICATIONS

Huawei, et al., "On the Relation Between Satellite Beam and NR Cell/SSB", 3GPP Draft, 3GPP TSG-RAN WG2#104, R2-1818245, On the Relation Between Satellite Beam and NR Cell and SSB, 3rd Generation Partnership Project (3GPP), Mobile Competence Centre, 650, Route Des Lucioles, F-06921 Sophia-Antipolis Cedex, vol. RAN WG2, No. Spokane, USA, Nov. 12, 2018-Nov. 16, 2018, Nov. 12, 2018 (Nov. 12, 2018), XP051557746, 4 Pages, Retrieved from the Internet: URL: http://www.3gpp.org/ftp/Meetings%5F3GPP%5FSYNC/RAN2/Docs/R2%2D1818245%2Ezip. [retrieved on Nov. 12, 2018] Section 2.
International Search Report and Written Opinion—PCT/US2020/055315—ISA/EPO—dated Feb. 12, 2021.
Nokia: et al., "Discussion on Satellite beams and their mapping to NR cells", 3GPP Draft, 3GPP TSG-RAN WG2 Meeting #107, R2-1911289, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019 (Aug. 16, 2019), XP051769046, 5 Pages, Retrieved from the Internet: URL: http://www.3gpp.org/ftp/tsg_ran/WG2_RL2/TSGR2_107/Docs/R2-1911289.zip. [retrieved on Aug. 16, 2019] Section 2.

* cited by examiner

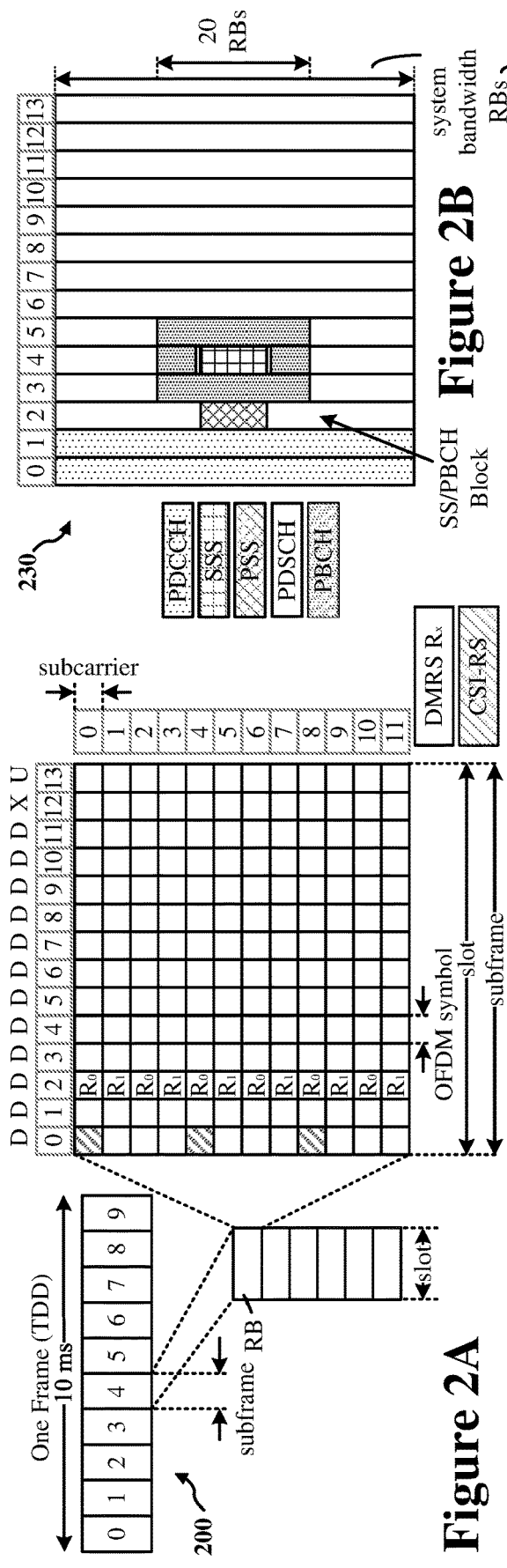
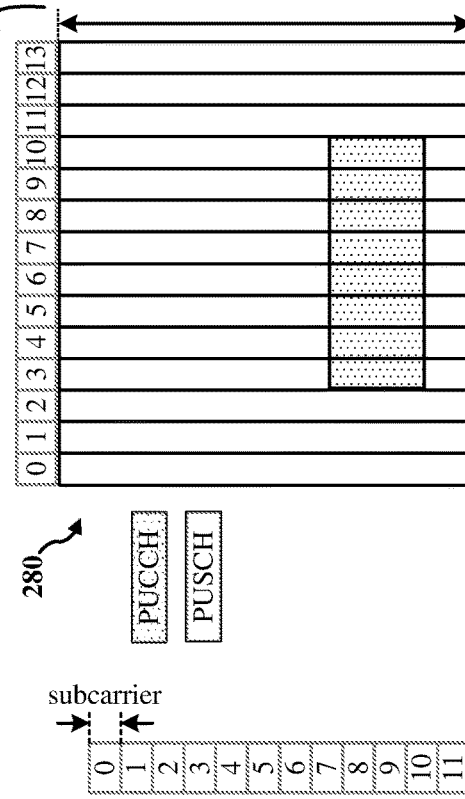
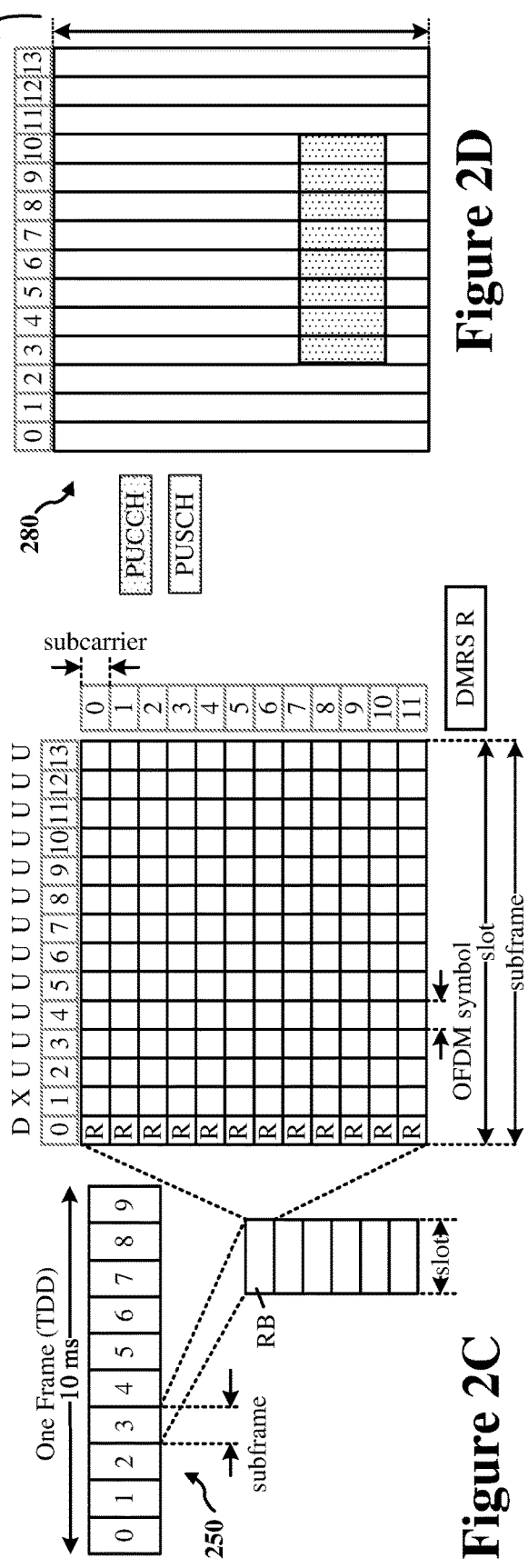
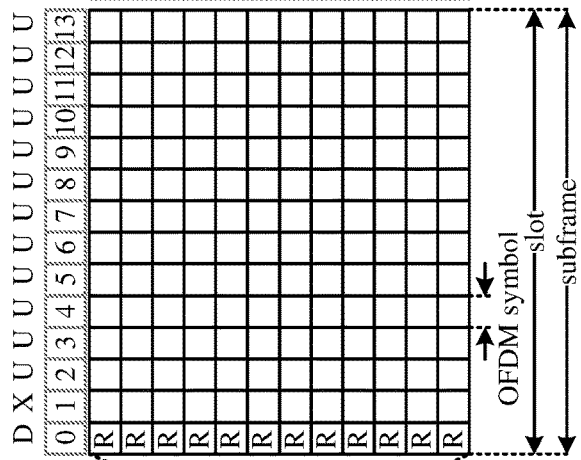
Figure 2A
Figure 2B
Figure 2C
Figure 2D

620 ⤵

```
┌─────────────────────────────────────────────────────────────┐
│ Detecting a change in SSB from the first SSB to the second SSB. │
│                         (622)                                │
└─────────────────────────────────────────────────────────────┘
                              │
                              ▼
┌─────────────────────────────────────────────────────────────┐
│ Determining that a beam switch has occurred, from the first beam to │
│ the second beam, based at least in part on the change in SSB. (624) │
└─────────────────────────────────────────────────────────────┘
                              │
                              ▼
┌─────────────────────────────────────────────────────────────┐
│ Switching communications with the satellite, based on the second │
│   mapping, to the UL BWP or the DL BWP for the second beam     │
│ responsive to determining that the beam switch has occurred. (626) │
└─────────────────────────────────────────────────────────────┘
```

```
┌─────────────────────────────────────────────────────────────┐
│ Determining that a BWP switch has occurred from the UL BWP or │
│ the DL BWP for the first beam to the UL BWP or the DL BWP for │
│                    the second beam. (632)                    │
└─────────────────────────────────────────────────────────────┘
                              │
                              ▼
┌─────────────────────────────────────────────────────────────┐
│ Implementing a change in SSB from the first SSB to the second SSB │
│  responsive to determining that the BWP switch has occurred. (634) │
└─────────────────────────────────────────────────────────────┘
```

Detecting a second SSB transmitted by the satellite via a second beam. (642)

↓

Determining that the second beam shares the one or more communication parameters associated with the first beam. (644)

↓

Mapping the second SSB to the one or more wireless communication parameters associated with the first beam. (646)

Detecting changes to one or more of the wireless communication parameters associated with the first beam. (652)

↓

Updating the mapping based on the changes to the one or more wireless communication parameters. (654)

Figure 6F

BEAM CONFIGURATION AND PARAMETER MANAGEMENT FOR NON-TERRESTRIAL NETWORKS

CROSS-REFERENCE TO RELATED APPLICATIONS

This Patent Application claims priority to U.S. Provisional Patent Application No. 62/923,252 entitled "BEAM CONFIGURATION AND PARAMETER MANAGEMENT FOR NON-TERRESTRIAL NETWORKS" and filed on Oct. 18, 2019, which is assigned to the assignee hereof. The disclosure of the prior Application is considered part of and are incorporated by reference in this Patent Application.

TECHNICAL FIELD

This disclosure relates generally to wireless communication and, more specifically, to managing beam configurations and parameters for non-terrestrial networks.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal-frequency-division-multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems (e.g., non-terrestrial networks (NTNs)) may utilize satellites (which may broadly refer to any high-altitude platform (e.g., drones)) as relay devices between ground base stations and ground gateways. In NTNs, the satellite may be moving at a high speed relative to UEs operating within the NTN, which may be at or relatively near ground level. In some implementations, the high relative speed of the satellite may result in a corresponding high relative speed of a moving coverage area provided by the satellite to a UE. Thus, the UE may undergo a high frequency of handover procedures (such as from one satellite beam to another). Improved solutions for managing beam configurations and parameters may be desired.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include detecting a first synchronization signal block (SSB) transmitted by a satellite via a first beam; determining one or more wireless communication parameters associated with the first beam; generating a first mapping between the first SSB and the one or more wireless communication parameters associated with the first beam; and communicating with the satellite based at least in part on the first mapping. In some implementations, the one or more wireless communication parameters may include beam-specific communication parameters.

In some implementations, the first mapping may include a frequency index or a time index associated with the first SSB. In implementations where the first SSB is frequency-multiplexed with other SSB s transmitted by the satellite, the generating of the first mapping may include determining the frequency index based on a frequency on which the first SSB is detected and mapping the frequency index to the one or more wireless communication parameters associated with the first beam. In implementations where the first SSB is time-multiplexed with other SSBs transmitted by the satellite, the generating of the first mapping may include determining the time index based on a time at which the first SSB is detected and mapping the time index to the one or more wireless communication parameters associated with the first beam.

In some implementations, the determining of the one or more wireless communication parameters may include receiving a master information block (MIB) and one or more a system information blocks (SIB s) from the satellite via the first beam. The one or more wireless communication parameters may be determined based at least in part on the received MIB or the one or more SIBs. In some implementations, the one or more wireless communication parameters may include one or more physical random-access channel (PRACH) parameters for the first beam. In some other implementations, the one or more wireless communication parameters may include one or more timers or delay-specific configurations. In some other implementations, the one or more wireless communication parameters may be determined from a plurality of different SIB s received from the satellite.

In some implementations, the one or more wireless communication parameters may include at least one of an uplink (UL) bandwidth part (BWP) or downlink (DL) BWP for the first beam. For example, at least one of the UL BWP or the DL BWP may include a default BWP to be used for UL or DL communications, respectively, after an active BWP has been inactive for a threshold duration. The wireless communication device may access the satellite, initially, via the UL BWP for the first beam. In some implementations, the initial access may be performed without receiving BWP switching instructions from the satellite. The wireless communication device also may receive DL transmissions from the satellite via the DL BWP for the first beam. In some implementations, the DL transmissions may include system information for a wireless network associated with the satellite. In some other implementations, the DL transmissions indicate at least one of a common search space or a paging search space.

In some implementations, the method may further include detecting a second SSB transmitted by the satellite via a second beam, determining one or more wireless communication parameters associated with the second beam, and generating a second mapping between the second SSB and the one or more wireless communication parameters associated with the second beam. In some implementations, the one or more wireless communication parameters associated with the second beam may be different than the one or more wireless communication parameters associated with the first beam. In some implementations, the one or more wireless communication parameters associated with the second beam includes a UL BWP or a DL BWP for the second beam.

In some implementations, the method may further include detecting a change in SSB from the first SSB to the second SSB; determining that a beam switch has occurred, from the first beam to the second beam, based at least in part on the change in SSB; and switching communications with the satellite, based on the second mapping, to the UL BWP or the DL BWP for the second beam responsive to determining that the beam switch has occurred. In some implementations, the change in SSB may be detected based at least in part on changes in a transmission configuration indicator (TCI). For example, the changes in the TCI may include changes to a quasi-colocation (QCL) type. In some other implementations, the change in SSB may be detected based at least in part on changes in spatial relation information (SRI).

In some implementations, the method may further include determining that a BWP switch has occurred from the UL BWP or the DL BWP for the first beam to the UL BWP or the DL BWP for the second beam, and implementing a change in SSB from the first SSB to the second SSB responsive to determining that the BWP switch has occurred. In some implementations, the change in SSB may be implemented via changes in SRI.

In some implementations, the method may further include detecting changes to the one or more wireless communication parameters associated with the first beam and updating the mapping based on the changes to the one or more wireless communication parameters. In some implementations, the detecting of the changes to the one or more wireless communication parameters may include receiving SIB updates or paging from the satellite via the first beam. For example, the changes to the one or more wireless communication parameters may be detected based on the received SIB updates or paging.

In some other implementations, the method may further include detecting a second SSB transmitted by the satellite via a second beam, determining that the second beam shares the one or more communication parameters associated with the first beam, and mapping the second SSB to the one or more wireless communication parameters associated with the first beam.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to detect a first SSB transmitted by a satellite via a first beam; determine one or more wireless communication parameters associated with the first beam; generate a first mapping between the first SSB and the one or more wireless communication parameters associated with the first beam; and communicate with the satellite based at least in part on the first mapping.

Another innovative aspect of the subject matter described in this disclosure can be implemented in a wireless communication device. In some implementations, the wireless communication device may include means for detecting a first synchronization signal block (SSB) transmitted by a satellite via a first beam; means for determining one or more wireless communication parameters associated with the first beam; means for generating a first mapping between the first SSB and the one or more wireless communication parameters associated with the first beam; and means for communicating with the satellite based at least in part on the first mapping.

Another innovative aspect of the subject matter described in this disclosure can be implemented in a non-transitory computer-readable memory including instructions that are executable by one or more processors of a wireless communication device. In some implementations, execution of the instructions by the one or more processors causes the wireless communication device to detect a first SSB transmitted by a satellite via a first beam; determine one or more wireless communication parameters associated with the first beam; generate a first mapping between the first SSB and the one or more wireless communication parameters associated with the first beam; and communicate with the satellite based at least in part on the first mapping.

BRIEF DESCRIPTION OF THE DRAWINGS

FIGS. 2A, 2B, 2C, and 2D show examples of a first 5G/NR frame, downlink (DL) channels within a 5G/NR slot, a second 5G/NR frame, and uplink (UL) channels within a 5G/NR slot, respectively.

FIG. 6C shows a flowchart illustrating an example process for wireless communication that supports beam configuration and parameter management for NTN wireless communications systems according to some implementations.

FIG. 6D shows a flowchart illustrating an example process for wireless communication that supports beam configuration and parameter management for NTN wireless communications systems according to some implementations.

FIG. 6E shows a flowchart illustrating an example process for wireless communication that supports beam configuration and parameter management for NTN wireless communications systems according to some implementations.

FIG. 6F shows a flowchart illustrating an example process for wireless communication that supports beam configuration and parameter management for NTN wireless communications systems according to some implementations.

DETAILED DESCRIPTION

Figure 1:
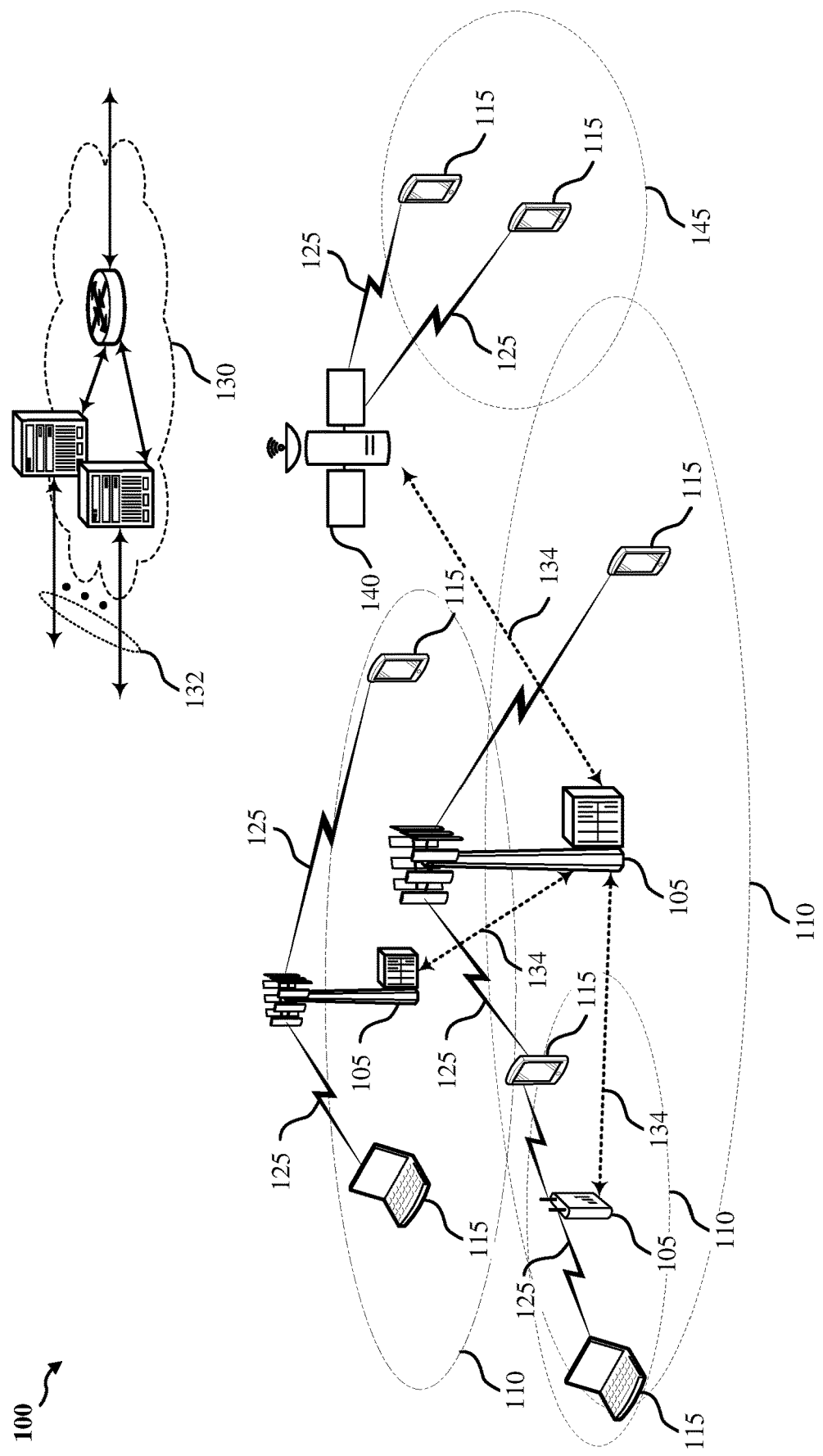
FIG. 1 shows a diagram of an example wireless communications system and an access network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Various implementations relate generally to managing beam configurations and parameters in non-terrestrial network (NTN) wireless communications systems. A "cell" refers to a logical communication entity used for communication with a base station or satellite, and may be associated with an identifier for distinguishing neighboring cells (such as a physical cell identifier (PCID), a virtual cell identifier (VCID)) operating via the same or a different carrier. In some implementations, a cell may define a grouping (such as the set or a subset) of beams provided by a satellite. Thus, multiple beams may include the same cell ID and system information. On the other hand, each beam may have its own bandwidth part (BWP) and other beam-specific parameters (such as physical random-access channel (PRACH) parameters, timers, delay-specific configurations, and the like). However, because they share the same cell ID, beams belonging to the same cell may be otherwise indistinguishable to a user equipment (UE).

In some implementations, a UE may detect a synchronization signal block (SSB) transmitted by a satellite via a first beam. Aspects of the present disclosure recognize that each beam may be identified by a unique SSB index based at least in part on a time or frequency on which the SSB is received. Thus, the SSB may be identified based on a frequency-domain SSB index or a time-domain SSB index. The UE may further determine one or more wireless communication parameters associated with the first beam. Example wireless communication parameters may include, but are not limited to, uplink (UL) or downlink (DL) BWPs, PRACH parameters, timers or delay-specific configurations, and any other beam-specific configurations. The UE may generate a mapping between the SSB and the wireless communication parameters associated with the first beam, and thereafter communicate with the satellite using the mapping.

Particular implementations of the subject matter described in this disclosure can be implemented to realize one or more of the following potential advantages. By mapping an SSB index (or identifier) of a respective beam to beam-specific configurations for that beam, aspects of the present disclosure may improve the speed or efficiency of wireless communications between a UE and a satellite. For example, upon detecting a particular beam (or beam change), the UE may refer to the mapping to determine beam-specific configurations and parameters of the detected beam. This allows the UE to directly initiate UL or DL communications with the satellite using the known beam parameters (such as UL BWP, DL BWP, PRACH, and the like). More specifically, the UE need not wait for any additional signaling (such as a beam switch message) from the satellite before initiating such communications.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100 and an access network. The wireless communications system 100 includes base stations 105, UEs 115, one or more satellites 140, and a core network 130. In some examples, the wireless communications system 100 may be a Long Term Evolution (LTE) network, an LTE-Advanced (LTE-A) network, an LTE-A Pro network, or a New Radio (NR) network. In some implementations, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

Wireless communications system 100 may be a non-terrestrial network (NTN) and may utilize one or more satellites 140 (which may broadly refer to any high-altitude platform) (e.g., as relay devices). For example, base stations 105 (or ground gateways) may wirelessly communicate with UEs 115 via one or more satellites 140 (e.g., or high-altitude platforms). The satellites 140 may relay communications between base stations 105 and UEs 115, or in some implementations comprise or otherwise perform functions ascribed herein to base stations 105. Each satellite 140 may be associated with a geographical area 145 in which communications with various UEs 115 is supported. In some implementations, a geographical area 145 may have properties ascribed herein to geographic coverage areas 110. Each satellite 140 may provide communication coverage for a respective geographical area 145 via communication links 125, and communication links 125 between a satellite 120 and a UE 115 may utilize one or more carriers.

Communication links 125 shown in wireless communications system 100 may include upstream transmissions from a UE 115 (e.g., to a satellite 140, to a base station 105 via satellite 140), or downstream transmissions to a UE 115 (e.g., from a satellite 140, from a base station 105 via satellite 140). In some implementations, transmissions from the ground (e.g., from a UE 115 or base station 105) to a satellite 140 may be referred to as uplink transmissions and transmissions from a satellite 140 to the ground (e.g., to a UE 115 or base station 105) may be referred to as downlink transmissions. Thus, depending on whether a gateway (e.g., a base station 105) may be collocated with (e.g., included in) a satellite 140 or at the ground, either upstream or downstream transmissions may include a mix of uplink and downlink transmissions.

Downstream transmissions may also be called forward link transmissions while upstream transmissions may also be called reverse link transmissions. A geographical area 145 may be an area associated with a transmission beam of a satellite 140. In some implementations, a geographical area 145 may be referred to as a beam footprint.

The geographic coverage area 110 for a base station 105 or the geographical area 145 for a satellite 140 may be divided into sectors making up only a portion of the geographic coverage area 110 or the geographical area 145, and in some implementations, each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 or satellite 140 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some implementations, the term "cell" may refer to a portion of a geographic coverage area 110 or geographical area 145 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some implementations, UEs 115 may be designed to support critical functions (e.g., mission critical functions), and a wireless communications system 100 may be configured to provide ultra-reliable communications for these functions.

In some implementations, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). Base stations 105 may communicate with satellites 140 wirelessly over backhaul links 134 (e.g., via an X2 or other interface).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some implementations, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105, satellite 140, or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105, a satellite 140) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a satellite 140, a base station 105, or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a satellite 140 or a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some implementations, the antennas of a base station 105, a satellite 140, or UE 115 may be located within one or more antenna arrays, which may support MIMO operations, or transmit or receive beamforming. For example, one or more base station antennas or antenna arrays may be co-located at an antenna assembly, such as an antenna tower. In some implementations, antennas or antenna arrays associated with a base station 105 or satellite 140 may be located in diverse geographic locations. A base station 105 or a satellite 140 may have an antenna array with a number of rows and columns of antenna ports that the base station 105 or the satellite 140 may use to support beamforming of communications with a UE 115. Likewise, a UE 115 may have one or more antenna arrays that may support various MIMO or beamforming operations.

In some implementations, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some implementations perform packet segmentation and reassembly to communicate over logical channels. A Media Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some implementations, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30{,}720{,}000$ seconds. Time intervals of a communications resource may be organized according to radio frames each having a duration of 10 milliseconds (ms), where the frame period may be expressed as $Tf=307{,}200$ $Ts$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some implementations, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some aspects, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105 or between a UE 115 and a satellite 140.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In some implementations, a carrier may be subdivided into portions, each portion having a smaller bandwidth than the carrier bandwidth (e.g., 100 MHz), and such portions may be referred to as bandwidth parts or BWPs. For example, some devices (e.g., some UEs 115) may not support the full bandwidth of a carrier, and thus may communicate using one or more BWPs. In some implementations, a UE 115 may establish communications with a base station 105 or satellite 140 using a first BWP, which may be referred to as an initial BWP, and the UE 115 may thereafter switch to a different BWP. In some implementations, BWPs may be paired or otherwise grouped. For example, a UE 115 may communicate using paired or grouped uplink and downlink BWPs (e.g., in an FDD implementation). Further, in some implementations a UE 115 that switches to a different BWP may switch (e.g., concurrently or simultaneously or as part of a single BWP-switching operation) from a first pair or other group of BWPs to a second pair or other group BWPs.

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some implementations, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some implementations, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some implementations, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115, base station 105, or satellite 140 utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some implementations, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Base stations 105 may utilize satellites 140 to relay communications to UEs 115. Due to the mobility of the satellites 140, UEs 115 communicating with satellites 140 may undergo a high frequency of handover procedures. For example, a UE 115 may frequently switch between the different beams provided by a satellite 140. As described above, a cell may define a grouping (such as the set or a subset) of beams provided by the satellite 140. Thus, multiple beams may include the same cell ID and/or system information. On the other hand, each beam may have its own BWP and other beam-specific parameters (such as PRACH parameters, timers, delay-specific configurations, and the like). In some implementations, a UE may map the beam-specific parameters to a particular beam based, at least in part, on a synchronization signal block (SSB) associated with that beam. By maintaining a mapping of beam-specific configurations for each beam of the satellite 140, aspects of the present disclosure may improve the speed or efficiency of handovers (and initial access) between the UE 115 and the satellite 140.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. The 5G/NR frame structure may be FDD in which, for a particular set of subcarriers (carrier system bandwidth), slots within the set of subcarriers are dedicated for either DL or UL In other cases, the 5G/NR frame structure may be TDD in which, for a particular set of subcarriers (carrier system bandwidth), slots within the set of subcarriers are dedicated for both DL and UL. In the examples shown in FIGS. 2A and 2C, the 5G/NR frame structure is configured as TDD, with slot 4 being configured with slot format 28 (with mostly DL), where D indicates DL, U indicates UL, and X indicates that the slot is flexible for use between DL/UL, and slot 3 being configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). This format may also apply to a 5G/NR frame structure that is FDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^\mu*15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as a physical RB (PRB)) that extends across 12 consecutive subcarriers and across a number of symbols. The intersections of subcarriers and symbols of the RB define multiple resource elements (REs). The number of bits carried by each RE depends on the modulation scheme.

As illustrated in FIG. 2A, some of the REs carry a reference (pilot) signal (RS) for the UE. In some configurations, one or more REs may carry a demodulation RS (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs may also include a beam measurement RS (BRS), a beam refinement RS (BRRS), and a phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
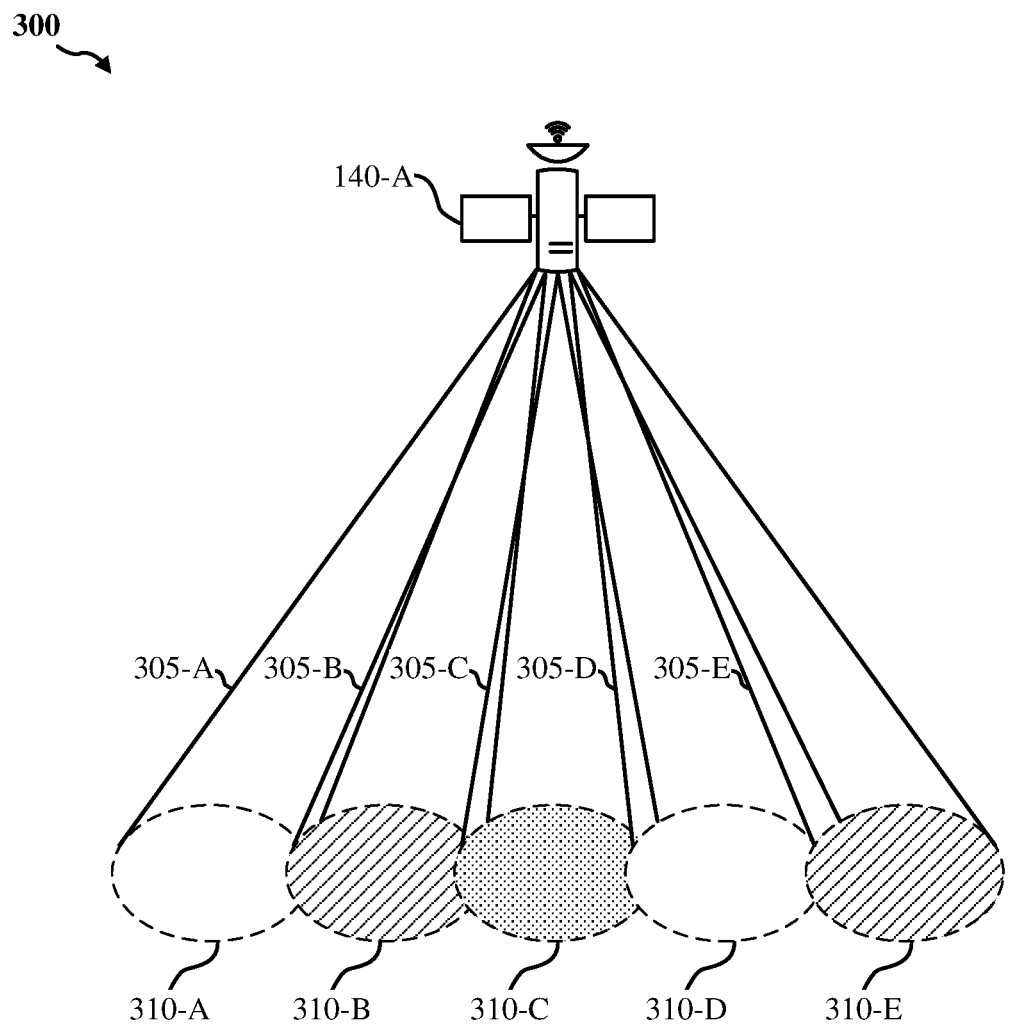
FIG. 3 shows an example non-terrestrial network (NTN) wireless communications system that supports intra-satellite handover according to some implementations.

FIG. 3 shows an example NTN wireless communications system 300 that supports intra-satellite handover according to some implementations. In some examples, wireless communications system 300 may include aspects of wireless communications system 100. For example, wireless communications system 300 may include satellite 140-a which may be an example of a satellite 140 as described with reference to FIG. 1.

As described herein, satellite 140-a may utilize any number of beam transmissions for ground communications. In some implementations, satellite 140-a may use beams 305 for ground communications. Each beam 305 may be associated with a beam footprint 310, and various devices (e.g., UEs 115) located in a beam footprint 310 may communicate with satellite 140-a via the corresponding beam 305. The area spanned by a summation of the beam footprints 310 of the beams 305 supported by satellite 140-a (e.g., the area spanned by beam footprints 305-a, 305-b, 305-c, 305-d, and 305-e) may be an example of a geographic area 145 as described with reference to FIG. 1.

Satellite 140-a may use different frequencies between one or more of beams 305. That is, each of the beams 305 utilized for ground communications by satellite 140-a may not be the same frequency. For example, satellite 140-a may use beams 305 which each may operate on one of any number of different frequencies.

In some implementations, each beam 305 may constitute an individual cell. For example, beams 305-a, 305-b, 305-c, 305-d, and 305-e may each constitute one of five cells supported by satellite 140-a.

In some implementations, a set of beams 305 may constitute a cell. For example, each frequency may define a cell, and beams 305 having the same frequency may thus constitute a single cell. For example, beams 310-a and 310-d may constitute one cell that operates at a first frequency, beams 310-b and 310-e may constitute a different cell that operates at a second frequency, and beam 310-c may constitute its own cell operating at a third frequency.

In some implementations, a set of beams 305 having different frequencies 305 may constitute a single cell, and each beam 305 within the single cell may comprise a BWP of the single cell. For example, beams 305-a, 305-b and 305-c may constitute one cell, where each beam 305 within the cell constitutes a BWP within the cell.

In some implementations, each satellite 140-a may constitute a cell, and each beam 305 or frequency may define a BWP. For example, beams 310-a and 310-d may in some implementations constitute a first BWP that operates at a first frequency, beams 310-b and 310-e may in some implementations constitute a second BWP that operates at a second frequency, and beam 310-c may in some implementations constitute a third BWP operating at a third frequency.

In some implementations, the number of frequency bands utilized by satellite 140-a may be referred to as a frequency reuse factor. Here, satellite 140-a may simultaneously transmit five beams 305 with a frequency reuse factor of three, indicating that satellite 140-a may utilize one of three different frequency bands for each beam 305, and a maximum of two beams 305 may use the same frequency. However, wireless communications system 300 may not be limited to five beams 305 with a frequency reuse factor of three and may instead have more or fewer beams 305 and/or a higher or lower frequency reuse factor. In some aspects, beams 305 of different frequency bands may interfere with each other less than beams 305 of the same frequency band. For example, beams 305-a and 305-b, which utilize different frequency bands (a first frequency and a second frequency respectively) may experience and/or cause less interference between each other when compared to beams 305-a and 305-d, which utilize the same frequency band in the first frequency.

In some implementations, satellite 140-a may be moving relative to a ground device in communication with satellite 140-a via a beam 305. For example, satellite 140-a may be in a non-geostationary orbit, such as a low earth orbit (LEO). In some implementations, satellite 140-a may orbit the earth more than one time per day. In some implementations, the relative motion of satellite 140-a when compared to a ground device may result in a corresponding relative motion of beam footprints 310. That is, as satellite 140-a moves relative to a ground device (e.g., a UE 115), beam footprint 310-d may move to a location previously associated with beam footprint 310-e. In this example, a device located at the location first associated with beam footprint 310-d and then associated with beam footprint 310-e may switch communications from beam 305-d to beam 305-e. The device, in addition to establishing communications with a different beam 305, may establish communications using one or more different frequencies. In some implementations, as described herein, the device may establish communications with a different frequency without undergoing a random access procedure (e.g., by reusing timing or other configuration information obtained while communicating using a prior frequency).

Figure 4:
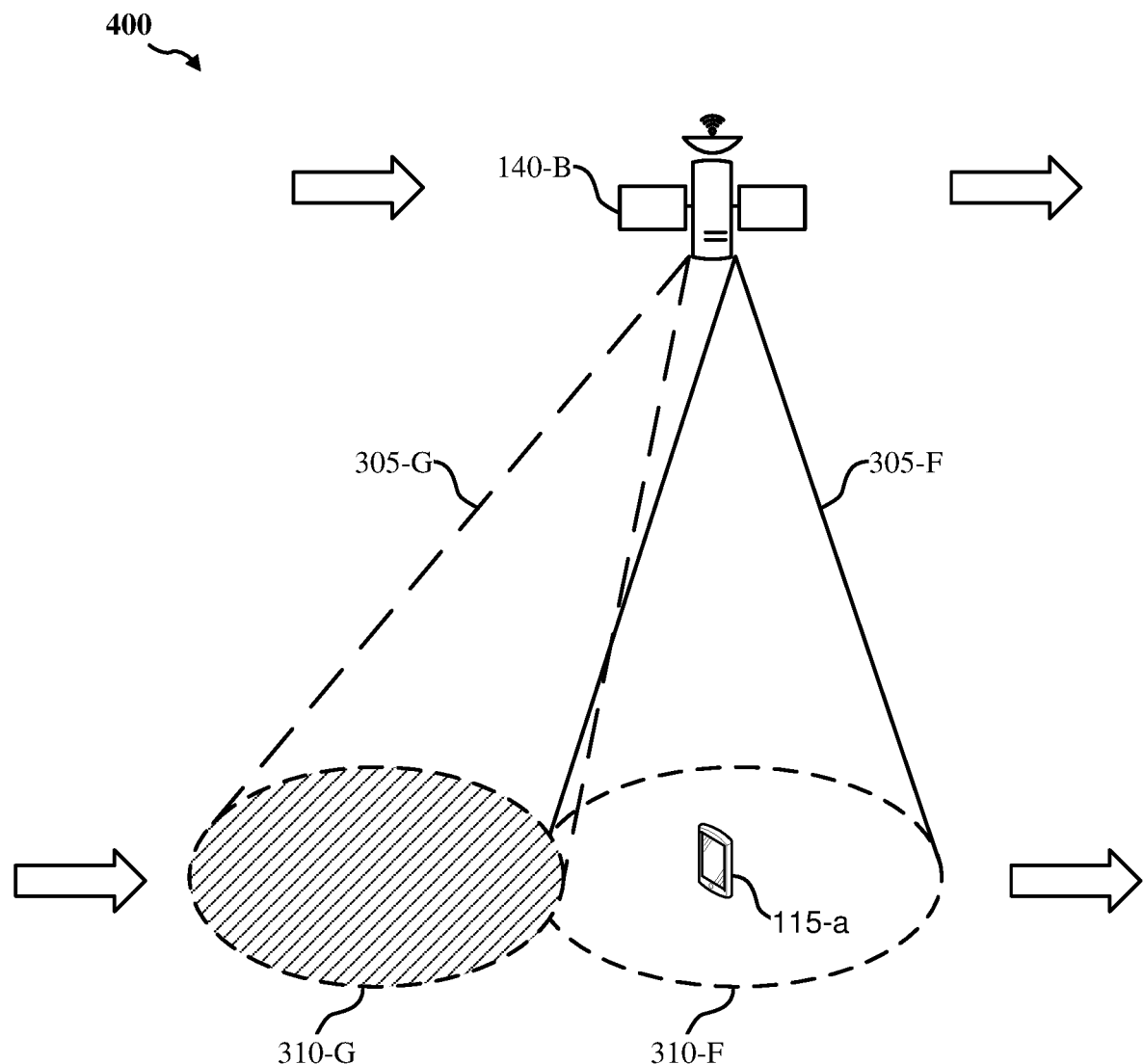
FIG. 4 shows an example NTN wireless communications system that supports intra-satellite handover according to some implementations.

FIG. 4 shows an example NTN wireless communications system 400 that supports intra-satellite handover in accordance with some implementations. In some examples, wireless communications system 400 may include aspects of wireless communications system 100 and 300. Wireless communications system 400 includes a satellite 140-b which may be an example of satellites 140 and 140-a as described with reference to FIGS. 1 and 3. Further, wireless communications system 400 includes UE 115-a which may be an example of UEs 115 as described with reference to FIG. 1.

In some implementations, satellite 140-b may utilize beams 305-f and 305-g for ground communications with devices such as UE 115-a. In some implementations, satellite 140-b may provide communication coverage for a beam footprint 310 corresponding to the beam footprint of beams 305. Satellite 140-b may move relative to devices such as UE 115-a. For example, satellite 140-b may be in a LEO such that satellite 140-b may move at relatively high speeds in comparison to UE 115-a (e.g., 7.5 km/s). In some implementations, satellite 140-b (and therefore any beams 305 supported by satellite 140-b) may move according to the arrows in wireless communications system 400. Therefore, satellite 140-b may provide communications coverage for moving beam footprints 310. In this case, beam footprints 310 may also move according to the arrows in wireless communications system 400.

UE 115-a may at one time be in communication with satellite 140-b via beam 305-f as UE 115-a may be within the beam footprint 310-a of beam 305-f. UE 115-a may be communicating via beam 305-f within a first frequency band. UE 115-a may initiate communications with satellite 140-b via a random-access procedure. Satellite 140-b may transmit synchronization information for communications via beam 305-f, and UE 115-a may transmit a random-access preamble, which may also be referred to as a PRACH signal or message 1 (Msg1) of the random access procedure.

In some implementations, satellite 140-b may transmit the synchronization information as part of one or more of a primary synchronization signal (PSS) or a secondary synchronization signal (SSS). A PSS may be a sequence transmitted within a beam by satellite 140-b on a periodic basis and may allow a device within the corresponding beam footprint 310 (e.g., a UE 115) to achieve synchronization at a slot or TTI level of granularity. A PSS may also include some information regarding the identity of the beam 305 (e.g., within a larger group of beams 305, thus reducing the number of possible identities for the beam 305), along with information that may enable the device to locate and receive an SSS. In some implementations, the PSS may be based on Zadoff-Chu (ZC) sequences or m-sequences.

Satellite 140-b may also transmit the SSS on a periodic basis, which may allow a device within the corresponding beam footprint 310 (e.g., a UE 115) to achieve synchronization at a less granular temporal level, such as at a frame level. In some implementations, satellite 140-b may transmit multiple SSSs (e.g., two SSSs) within a single frame according to a pattern such that, from receiving a single SSS and identifying its place in the pattern, the receiving device may determine frame timing. An SSS sequence may be based on maximum length sequences, known as M-sequences, and may be constructed by interleaving, in the frequency-domain, two length-31 Binary Phase Shift Keying (BPSK)-modulated sequences. The two underlying length-31 sequences may themselves be two different cyclic shifts of a single length-31 M-sequence. The cyclic shift indices of the M-sequences may be derived from a function of a physical layer cell identity group that includes the cell's identity. Thus, a device (e.g., a UE 115) may be able to derive the applicable beam 305 identity group from the SSS and, combined with the identity information that the device may have obtained from the PSS, thereby determine the complete identity of the beam 305.

The synchronization information transmitted by satellite 140-b (e.g., synchronizations signals) may indicate to UE 115-a a timing configuration (or timing information) for communicating with satellite 140-b via beam 305-f. For example, the synchronization information may indicate timing configuration necessary for UE 115-a to both transmit and receive communications with satellite 140-b via beam 305-f. The synchronization information may communicate both upstream and downstream timing configurations. In some implementations, UE 115-*a* may assume that communications with satellite 140-*b* via one or more other beams 305 have the same timing configuration as communications via beam 305-*f*. For example, UE 115-*a* may determine the timing information for communications with satellite 140-*b* via beam 305-*g* based on the synchronization signal sent via beam 305-*f*. In some aspects, timing configuration and/or other aspects of communications via beam 305-*f* may be the same for communications via other beams 305 supported by satellite 140-*b* (e.g., beam 305-*g*). In some implementations, satellite 140-*b* may indicate any differences in configuration for communications via beam 305-*f* and communications via other beams 305 supported by satellite 140-*b* (e.g., beam 305-*g*).

Satellite 140-*b* may transmit radio resource management (RRM) configuration information to UE 115-*a* via beam 305-*f*. The RRM configuration may include cell or BWP IDs for one or more cells or BWPs supported by satellite 140-*b*. In some aspects, the RRM configuration may also include an indication of a center frequency and frequency bandwidth for the one or more cells/BWPs supported by satellite 140-*b*. The indication may be explicit or implicit. The implicit indication may include a single frequency bandwidth which UE 115-*b* may determine applies to the each of the one or more cells/BWPs supported by satellite 140-*b*.

Due to the relative motion of satellite 140-*b* and UE 115-*a*, UE 115-*a* may at some second time undergo a handover procedure between beam 305-*f* and beam 305-*g*, which may include UE 115-*a* transitioning from communicating over a first frequency associated with beam 305-*f* to communicating over a second frequency associated with beam 305-*g*. In some implementations, the handover from beam 305-*f* to beam 305-*g* may constitute a cell handover (e.g., beams 305-*f* and 305-*g* may comprise different cells). In this case, signals of different beams (e.g., beams 305-*f* and 305-*g*) may be transmitted at the same time using FDM or space-division multiplexing (SDM). In some other cases, the handover from beam 305-*f* to beam 305-*g* may constitute BWP switching within a single cell (e.g., beams 305-*f* and 305-*g* may be within the same cell). In this case, BWPs that are different frequencies (e.g., beams which are different frequencies) may be transmitted at the same time or at different times.

Various implementations relate generally to managing beam configurations and parameters in NTN wireless communications systems. As described above, a cell refers to a logical communication entity used for communication with a base station or satellite and may be associated with an identifier for distinguishing neighboring cells (such as a PCID or a VCID) operating via the same or a different carrier. In some implementations, a cell may define a grouping (such as the set or a subset) of beams provided by a satellite. Thus, multiple beams may include the same cell ID and/or system information. On the other hand, each beam may have its own BWP and other beam-specific parameters (such as PRACH parameters, timers, delay-specific configurations, and the like). However, because they share the same cell ID, beams belonging to the same cell may be otherwise indistinguishable to a UE.

In some implementations, a UE may detect an SSB transmitted by a satellite via a first beam. Aspects of the present disclosure recognize that each beam may be identified by a unique SSB index based at least in part on a time or frequency on which the SSB is received. Thus, the SSB may be identified based on a frequency-domain SSB index or a time-domain SSB index. The UE may further determine one or more wireless communication parameters associated with the first beam. Example wireless communication parameters may include, but are not limited to, UL or DL BWPs, PRACH parameters, timers or delay-specific configurations, and any other beam-specific configurations. The UE may generate a mapping between the SSB and the wireless communication parameters associated with the first beam, and thereafter communicate with the satellite using the mapping.

By mapping an SSB index (or identifier) of a respective beam to beam-specific configurations for that beam, aspects of the present disclosure may improve the speed or efficiency of wireless communications between a UE and a satellite. For example, upon detecting a particular beam (or beam change), the UE may refer to the mapping to determine beam-specific configurations and parameters of the detected beam. This allows the UE to directly initiate UL or DL communications with the satellite using the known beam parameters (such as UL BWP, DL BWP, PRACH, and the like). More specifically, the UE need not wait for any additional signaling (such as a beam switch message) from the satellite before initiating such communications.

Figure 5:
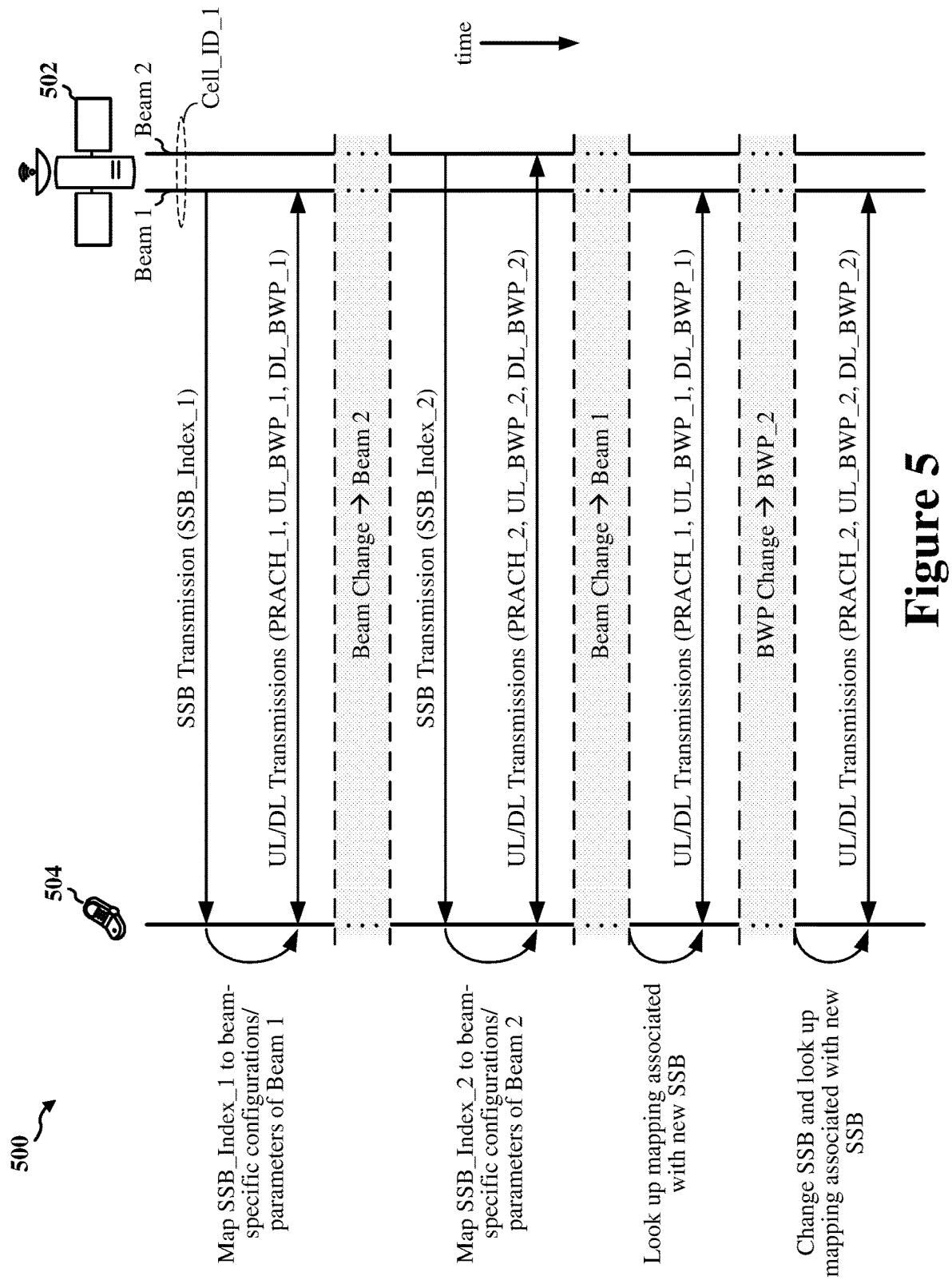
FIG. 5 shows a sequence diagram illustrating an example message exchange between a satellite and a UE according to some implementations.

FIG. 5 shows a sequence diagram illustrating an example message exchange 500 between a satellite 502 and a UE 504 according to some implementations. In some implementations, the satellite 502 may be one example of the satellite 140 of FIG. 1 or any of the satellites 140-A or 140-B of FIGS. 3 and 4, respectively, the UE 504 may be one example of the UE 115 of FIG. 1 or the UE 115-*a* of FIG. 4, and the access network may be a 5G NR access network. In some implementations, the satellite 502 may act as a relay for communications between the UE 504 and a base station (not shown for simplicity). In some other implementations, a base station may be physically integrated with the satellite 502. For example, the satellite 502 may perform one or more of the functions ascribed to the base station 105 of FIG. 1.

The satellite 504 may include a multitude of antennas that can be configured to wirelessly transmit or receive information on a plurality of different beams. For simplicity, only two beams (beam 1 and beam 2) are depicted in the example of FIG. 5. However, in actual implementations, the satellite 504 may be capable of providing any number of beams. With reference for example to FIG. 4, beam 1 may correspond to beam 205-*f* and beam 2 may correspond to beam 205-*g* provided by the satellite 140-*b*. In the example of FIG. 5, beam 1 and beam 2 are shown to belong to the same cell and are therefore associated with the same cell ID (cell_ID_1). However, in other implementations, beam 1 and beam 2 may belong to separate cells (not shown for simplicity), having separate cell IDs.

As shown in FIG. 5, the UE 504 initially detects an SSB transmitted by the satellite 502 on beam 1. The satellite 502 may periodically broadcast SSBs on each of its beams (in predefined bursts) to enable UEs in the vicinity to detect the corresponding beams. For example, the UE 504 attempts to detect the PSS and/or SSS of an SSB and decode the PBCH provided therewith. The timing or frequency on which an SSB is transmitted may vary depending on whether the SSBs are time-multiplexed or frequency-multiplexed across the various beams. For example, when multiplexed in time, the SSBs of respective beams will have different timing offsets and, when multiplexed in frequency, the SSBs of respective beams will have different frequency offsets.

Aspects of the present disclosure recognize that each beam of the satellite 504 can be uniquely identified based on the SSB transmitted over that beam. More specifically, each beam may be identified by an SSB index associated with the SSB for that beam. The SSB index for a particular beam may depend on the time or frequency on which the SSB is transmitted. For example, when the SSBs are frequency-multiplexed, each beam may be identified by a unique SSB frequency index based on the frequencies on which the SSBs are received by the UE 504. When the SSBs are time-multiplexed, each beam may be identified by a unique SSB time index based on the times at which the SSBs are received by the UE 504. As shown in FIG. 1, beam 1 may be uniquely identified by a first SSB index (SSB_Index_1) in the frequency or time domain.

In some implementations, the UE 504 may generate and/or store a mapping of SSB_Index_1 to one or more beam-specific configurations or parameters for beam 1. Example beam-specific configurations may include, but are not limited to, UL and/or DL BWPs (including center frequency, bandwidth, numerology, and other BWP-related information), one or more PRACH parameters, timers, delay-specific configurations, and other parameters that may be used for wireless communications on beam 1. The beam-specific configurations may be determined based on a master information block (MIB) carried on the PBCH, one or more system information blocks (SIBs) carried on the PDSCH, or other signaling mechanisms by the satellite 502 on beam 1. Some aspects or components of the beam-specific configurations may be signaled on separate SIB s.

The UE 504 may use the mapping between the SSB_Index_1 and the beam-specific configurations for beam 1 to facilitate faster and/or more efficient wireless communications with the satellite 502 (or access network) when communicating on beam 1. The UE 504 may use the UL BWP provided in the mapping (UL_BWP_1) to initiate UL transmissions to the satellite 502. In some implementations, the UE 504 may use UL_BWP_1 for initial access to the satellite 502 on beam 1. For example, the UE 504 may use the PRACH parameters provided in the mapping (PRACH_1) to initiate a random-access procedure with the satellite 502 or base station. More specifically, the UE 504 may initiate access to the satellite 502 without receiving any additional instructions (such as in lieu of BWP switching instructions) from the satellite 502.

The UE 504 also may use the DL BWP provided in the mapping (DL_BWP_1) to receive DL transmission for the satellite 502. In some aspects, the UE 504 may receive additional system information (such as for the access network) from the satellite 502 on DL_BWP_1. In some other aspects, the UE 504 may receive common search space and paging search space information from the satellite 502 on DL_BWP_1. In some implementations, UL_BWP_1 and/or DL_BWP_1 may correspond to a default BWP for the UE 504. For example, the UE 504 may return to this default BWP any time its active BWP remains inactive for at least a threshold duration. In some implementations, the UE 504 may update the beam-specific parameters (such as PRACH_1, UL_BWP_1, DL_BWP_1, and the like) in the mapping for beam 1 as new or updated beam-specific parameters become available. For example, the UE 504 may receive updated beam-specific parameters for beam 1 via SIB updates, paging, or other signaling mechanisms by the satellite 502.

After some time has passed, the beam on which the UE 504 communicates with the satellite 502 may change to beam 2. In some aspects, the beam change may be the result of a network-initiated handover such as by the satellite 502 (or base station) or another node of the access network (such as described with respect to FIG. 4). In some other aspects, the beam change may be the result of the UE 504 leaving the coverage area of the satellite 502 and reentering via the beam footprint of beam 2.

The UE 504 detects an SSB transmitted by the satellite 502 on beam 2. As described above, beam 2 may be uniquely identified by a second SSB index (SSB_Index_2) in the frequency or time domain. In some implementations, the UE 504 may generate and/or store a mapping of the second SSB index to one or more beam-specific configurations or parameters for beam 2 (such as UL/DL BWPs, PRACH parameters, timers, delay-specific configurations, and the like). The beam-specific configurations may be determined based on a MIB carried on the PBCH, one or more SIBS carried on the PDSCH, or other signaling mechanisms by the satellite 502 on beam 2. Some aspects or components of the beam-specific configurations may be signaled on separate SIBs.

In some aspects, the beam-specific configurations or parameters for beam 2 may be different than the beam-specific configurations or parameters for beam 1. In some other aspects, beam 2 may share one or more configurations or parameters with beam 1. For example, beam 2 and beam 1 may use the same UL BWPs, DL BWPs, PRACH parameters, and/or other wireless communication parameters. Thus, in some implementations, multiple SSBs and/or beams may be mapped to the same set (or subset) of beam configurations or parameters.

The UE 504 may use the mapping between SSB_Index_2 and the beam-specific configurations for beam 2 to facilitate faster and/or more efficient wireless communications with the satellite 502 (or access network) when communicating on beam 2. The UE 504 may use the UL BWP provided in the mapping (UL_BWP_2) to initiate UL transmissions to the satellite 502. In some implementations, the UE 504 may use UL_BWP_2 for initial access to the satellite 502 on beam 2. For example, the UE 504 may use the PRACH parameters provided in the mapping (PRACH_2) to initiate a random-access procedure with the satellite 502 or base station. More specifically, the UE 504 may initiate access to the satellite 502 without receiving any additional instructions (such as in lieu of BWP switching instructions) from the satellite 502.

The UE 504 also may use the DL BWP provided in the mapping (DL_BWP_2) to receive DL transmission for the satellite 502. In some aspects, the UE 504 may receive additional system information (such as for the access network) from the satellite 502 on DL_BWP_2. In some other aspects, the UE 504 may receive common search space and paging search space information from the satellite 502 on DL_BWP_2. In some implementations, UL_BWP_2 and/or DL_BWP_2 may correspond to a default BWP for the UE 504. For example, the UE 504 may return to this default BWP any time its active BWP remains inactive for at least a threshold duration. In some implementations, the UE 504 may update the beam-specific parameters (such as PRACH_2, UL_BWP_2, DL_BWP_2, and the like) for beam 2 as new or updated beam-specific parameters become available. For example, the UE 504 may receive updated beam-specific parameters for beam 2 via SIB updates, paging, or other signaling mechanisms by the satellite 502.

After some more time has passed, the UE 504 may detect a beam switch back to beam 1. In some implementations, the UE 504 may detect the occurrence of the beam switch as a change of SSB (such as from the SSB of beam 2 to the SSB of beam 1). In some aspects, the UE 504 may detect the change of SSB based, at least in part, on changes in a transmission configuration indicator (TCI) state for DL. For example, the UE 504 may detect the change of SSB based on changes to a quasi-colocation (QCL) type (such as Type D) associated with the TCI state. In some other aspects, the UE 504 may detect the change of SSB based, at least in part, on changes in spatial relation information (SRI) in UL scheduling.

Since the UE 504 has already mapped SSB_Index_1 to the beam-specific configurations or parameters of beam 1, the UE 504 need not wait for any additional information or signaling from the satellite 502 to begin communicating on beam 1. In other words, because beam 1 can be uniquely identified (by the SSB index), and the beam-specific configurations for beam 1 are already known (from the mapping), the UE 504 may directly communicate (or continue communicating) with the satellite 502 on beam 1 immediately after the beam switch occurs. For example, the UE 504 may transfer or switch UL transmissions from UL_BWP_2 to UL_BWP_1. The UE 504 also may transfer or switch DL transmissions from DL_BWP_2 to DL_BWP_1. Because no additional signaling is needed from the satellite 502, the transition(s) may occur seamlessly, with little or no interruption in throughput.

After some more time has passed, the UE 504 may detect a change in the active BWP to the BWP associated with beam 2. In some implementations, the satellite 502 may explicitly signal a change in the active BWP in a DCI frame or through RRC signaling. Upon detecting the change in BWP, the UE 504 may implement a correspond change in SSB (such as from the SSB of beam 1 to the SSB of beam 2). For example, the UE 504 may implement the change in SSB via changes in SRI for UL.

Since the UE 504 has already mapped SSB_Index_2 to the beam-specific configurations or parameters of beam 2, the UE 504 need not wait for any additional information or signaling from the satellite 502 to begin communicating on beam 2. In other words, because beam 2 can be uniquely identified (by the SSB index), and the beam-specific configurations for beam 2 are already known (from the mapping), the UE 504 may directly communicate (or continue communicating) with the satellite 502 on beam 2 immediately after the beam switch occurs. For example, the UE 504 may transfer or switch UL transmissions from UL_BWP_1 to UL_BWP_2. The UE 504 also may transfer or switch DL transmissions from DL_BWP_1 to DL_BWP_2. Because no additional signaling is needed from the satellite 502, the transition(s) may occur seamlessly, with little or no interruption in throughput.

Figure 6A:
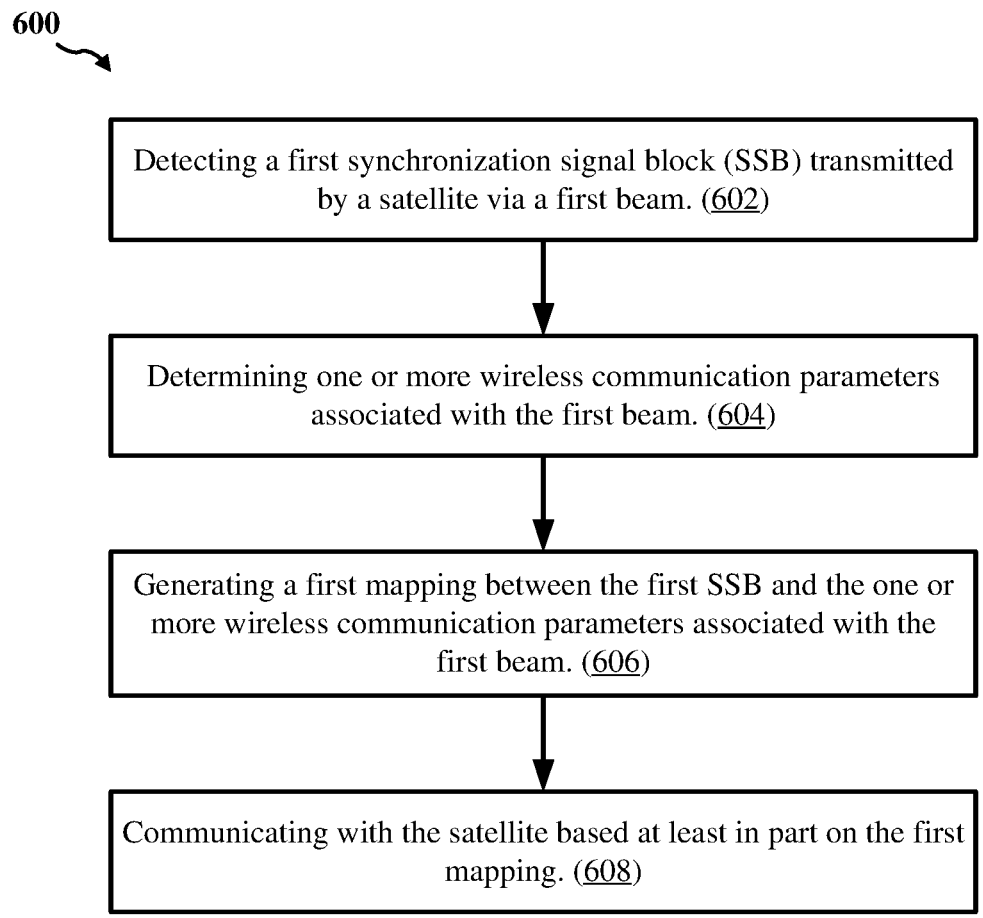
FIG. 6A shows a flowchart illustrating an example process for wireless communication that supports beam configuration and parameter management for NTN wireless communications systems according to some implementations.

FIG. 6A shows a flowchart illustrating an example process 600 for wireless communication that supports beam configuration and parameter management for NTN wireless communications systems according to some implementations. In some implementations, the process 600 may be performed by a wireless communication device operating as or within a network node, such as one of the UEs 115, 155-*a*, or 504 described above with reference to FIGS. 1, 4, and 5, respectively.

In some implementations, the process 600 begins in block 602 with detecting a first synchronization signal block (SSB) transmitted by a satellite via a first beam. In some implementations, the first SSB may be identified based on a frequency index or a time index associated with the first SSB. The frequency index may correspond to a frequency on which the first SSB is received by the UE. The time index may correspond to a time at which the first SSB is received by the UE.

In block 604, the process 600 proceeds with determining one or more wireless communication parameters associated with the first beam. The wireless communication parameters may be determined based at least in part on a MIB or a SIB received from the satellite via the first beam. Some wireless communication parameters may be determined from a plurality of different SIB s. In some implementations, the wireless communication parameters may be beam-specific communication parameters. Example wireless communication parameters may include, but are not limited to, a UL or DL BWP for the first beam, one or more PRACH parameters for the first beam, one or more timers or delay-specific configurations. In some implementations, the UL or DL BWP may correspond to a default BWP to be used by the UE after an active BWP has been inactive for a threshold duration.

In block 606, the process 600 proceeds with generating a first mapping between the first SSB and the one or more wireless communication parameters associated with the first beam. In block 608, the process 600 proceeds with communicating with the satellite based at least in part on the first mapping. In some implementations, the UE may use the UL BWP for the first beam for initial access to the satellite. For example, the initial access may be performed in lieu of BWP switching instructions from the satellite. In some other implementations, the UE may use the DL BWP for the first beam to receive DL transmissions from the satellite. In some aspects, the DL transmission may include system information for a wireless network associated with the satellite. In some other aspects, the DL transmissions indicate at least one of a common search space or a paging search space.

Figure 6B:
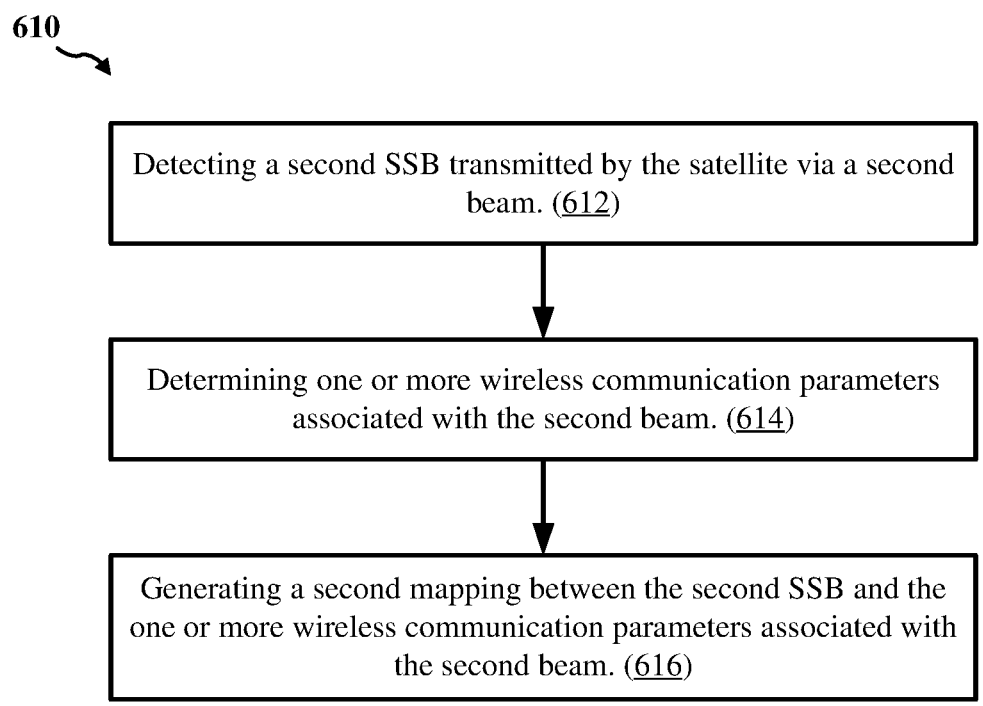
FIG. 6B shows a flowchart illustrating an example process for wireless communication that supports beam configuration and parameter management for NTN wireless communications systems according to some implementations.

FIG. 6B shows a flowchart illustrating an example process 610 for wireless communication that supports beam configuration and parameter management for NTN wireless communications systems according to some implementations. In some implementations, the process 610 may be performed by a wireless communication device operating as or within a network node, such as one of the UEs 115, 155-*a*, or 504 described above with reference to FIGS. 1, 4, and 5, respectively.

In some implementations, the process 610 begins after the process 600 described with reference to FIG. 6A. For example, the process 610 may begin, in block 612, after the communications with the satellite based at least in part on the first mapping in block 606 of the process 600.

In block 612, the process 610 proceeds with detecting a second SSB transmitted by the satellite via a second beam. In block 614, the process 610 proceeds with determining one or more wireless communication parameters associated with the second beam. In some implementations, the one or more wireless communication parameters associated with the second beam may be different than the one or more wireless communication parameters associated with the first beam. In some aspects, the one or more wireless communication parameters may include a UL or DL BWP for the second beam. In block 616, the process 610 proceeds with generating a second mapping between the second SSB and the one or more wireless communication parameters associated with the second beam.

FIG. 6C shows a flowchart illustrating an example process 620 for wireless communication that supports beam configuration and parameter management for NTN wireless communications systems according to some implementations. In some implementations, the process 620 may be performed by a wireless communication device operating as or within a network node, such as one of the UEs 115, 155-*a*, or 504 described above with reference to FIGS. 1, 4, and 5, respectively.

In some implementations, the process 620 begins after the process 610 described with reference to FIG. 6B. For example, the process 620 may begin, in block 622, after the second mapping between the second SSB and the one or more wireless communication parameters associated with the second beam has been generated in block 616 of the process 600.

In block 622, the process 620 proceeds with detecting a change in SSB from the first SSB to the second SSB. In some implementations, the change in SSB may be detected based at least in part on changes to a QCL Type-D in a TCI for DL. In some other implementations, the change in SSB may be detected based at least in part on changes to spatial relation information in UL scheduling. In block 624, the process 620 proceeds with determining that a beam switch has occurred, form the first beam to the second beam, based at least in part on the change in SSB. In block 626, the process 620 proceeds with switching communications with the satellite, based on the second mapping, to the UL BWP or the DL BWP for the second beam responsive to determining that the beam switch has occurred.

FIG. 6D shows a flowchart illustrating an example process 630 for wireless communication that supports beam configuration and parameter management for NTN wireless communications systems according to some implementations. In some implementations, the process 630 may be performed by a wireless communication device operating as or within a network node, such as one of the UEs 115, 155-a, or 504 described above with reference to FIGS. 1, 4, and 5, respectively.

In some implementations, the process 630 begins after the process 610 described with reference to FIG. 6B. For example, the process 630 may begin, in block 632, after the second mapping between the second SSB and the one or more wireless communication parameters associated with the second beam has been generated in block 616 of the process 600.

In block 632, the process 630 proceeds with determining that a BWP switch has occurred from the UL BWP or the DL BWP for the first beam to the UL BWP or the DL BWP for the second beam. In block 634, the process 630 proceeds with implementing a change in SSB from the first SSB to the second SSB responsive to determining that the BWP switch has occurred. In some implementations, the change in SSB may be implemented via changes to a QCL Type-D in a TCI for UL.

FIG. 6E shows a flowchart illustrating an example process 640 for wireless communication that supports beam configuration and parameter management for NTN wireless communications systems according to some implementations. In some implementations, the process 640 may be performed by a wireless communication device operating as or within a network node, such as one of the UEs 115, 155-a, or 504 described above with reference to FIGS. 1, 4, and 5, respectively.

In some implementations, the process 640 begins after the process 600 described with reference to FIG. 6A. For example, the process 640 may begin, in block 642, after the communications with the satellite based at least in part on the first mapping in block 606 of the process 600.

In block 642, the process 640 proceeds with detecting a second SSB transmitted by the satellite via a second beam. In block 644, the process 640 proceeds with determining that the second beam shares the one or more communication parameters associated with the first beam. In block 646, the process 640 proceeds with mapping the second SSB to the one or more wireless communication parameters associated with the first beam.

FIG. 6F shows a flowchart illustrating an example process 650 for wireless communication that supports beam configuration and parameter management for NTN wireless communications systems according to some implementations. In some implementations, the process 650 may be performed by a wireless communication device operating as or within a network node, such as one of the UEs 115, 155-a, or 504 described above with reference to FIGS. 1, 4, and 5, respectively.

In some implementations, the process 650 begins after the process 600 described with reference to FIG. 6A. For example, the process 650 may begin, in block 652, after the communications with the satellite based at least in part on the first mapping in block 606 of the process 600.

In block 652, the process 650 proceeds with detecting changes to one or more of the wireless communication parameters associated with the first beam. In some implementations, the changes may be detected based at least in part on SIB updates or paging received from the satellite via the first beam. In block 654, the process 650 proceeds with updating the mapping based on the changes to the one or more wireless communication parameters.

Figure 7:
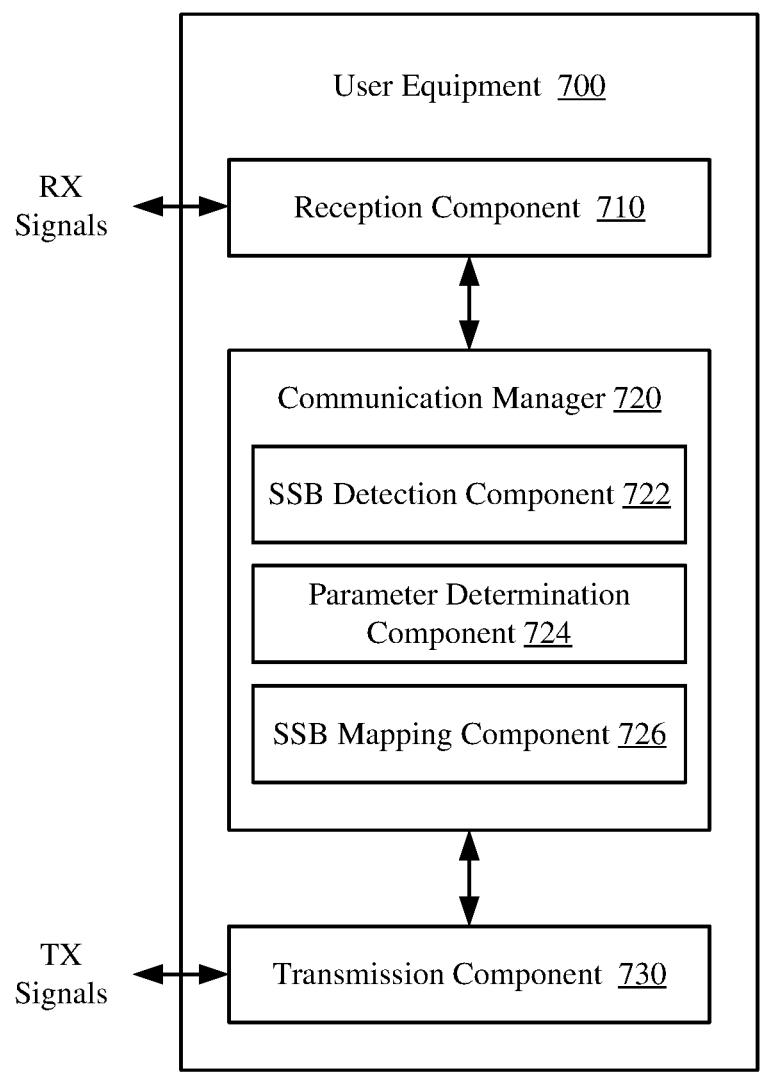
FIG. 7 shows a block diagram of an example user equipment (UE) according to some implementations.

FIG. 7 shows a block diagram of an example UE 700 according to some implementations. In some implementations, the UE 700 is configured to perform any of the processes 600-650 described above with reference to FIGS. 6A-6F, respectively. The UE 700 can be an example implementation of any of the UEs 115 or 504 described above with reference to FIGS. 1 and 5, respectively. For example, the UE 700 can be a chip, SoC, chipset, package or device that includes at least one processor and at least one modem (for example, a Wi-Fi (IEEE 802.11) modem or a cellular modem).

The UE 700 includes a reception component 710, a communication manager 720, and a transmission component 730. The communication manager 720 further includes an SSB detection component 722, a parameter determination component 724, and an SSB mapping component 726. Portions of one or more of the components 722-726 may be implemented at least in part in hardware or firmware. In some implementations, at least some of the components 722, 724, or 726 are implemented at least in part as software stored in a memory. For example, portions of one or more of the components 722, 724, and 726 can be implemented as non-transitory instructions (or "code") executable by a processor to perform the functions or operations of the respective component.

The reception component 710 is configured to receive RX signals representing DL communications from a base station or satellite. The transmission component 730 is configured to transmit TX signals representing UL communications to the base station or satellite. The communication manager 720 is configured to control or manage DL and UL communications with the base station or satellite. In some implementations, the SSB detection component 722 may detect a first SSB transmitted by a satellite via a first beam; the parameter determination component 724 may determine one or more wireless communication parameters associated with the first beam; the SSB mapping component 726 may generate a mapping between the first SSB and the one or more wireless communication parameters associated with the first beam.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of wireless communication, comprising:
   detecting a first synchronization signal block (SSB) transmitted by a satellite via a first beam;
   determining one or more wireless communication parameters associated with the first beam;
   generating a first mapping between the first SSB and the one or more wireless communication parameters associated with the first beam; and
   communicating with the satellite based at least in part on the first mapping.

2. The method of claim 1, wherein the first mapping includes a frequency index or a time index associated with the first SSB.

3. The method of claim 2, wherein the first SSB is frequency-multiplexed with other SSBs transmitted by the satellite, the generating of the first mapping comprising:
   determining the frequency index based on a frequency on which the first SSB is detected; and
   mapping the frequency index to the one or more wireless communication parameters associated with the first beam.

4. The method of claim 2, wherein the first SSB is time-multiplexed with other SSBs transmitted by the satellite, the generating of the first mapping comprising:
   determining the time index based on a time at which the first SSB is detected; and
   mapping the time index to the one or more wireless communication parameters associated with the first beam.

5. The method of claim 1, wherein the one or more wireless communication parameters comprise beam-specific communication parameters.

6. The method of claim 1, wherein the determining of the one or more wireless communication parameters comprises:
   receiving a master information block (MIB) and one or more a system information blocks (SIBs) from the satellite via the first beam, the one or more wireless communication parameters being determined based at least in part on the received MIB or the one or more SIBs.

7. The method of claim 6, wherein the one or more wireless communication parameters include one or more physical random-access channel (PRACH) parameters for the first beam.

8. The method of claim 6, wherein the one or more wireless communication parameters include one or more timers or delay-specific configurations.

9. The method of claim 6, wherein the one or more wireless communication parameters are determined from a plurality of different SIB s received form the satellite.

10. The method of claim 6, wherein the one or more wireless communication parameters includes at least one of an uplink (UL) bandwidth part (BWP) or downlink (DL) BWP for the first beam.

11. The method of claim 10, wherein at least one of the UL BWP or the DL BWP comprises a default BWP to be used for UL or DL communications, respectively, after an active BWP has been inactive for a threshold duration.

12. The method of claim 10, wherein the communicating comprises:
   accessing the satellite, initially, via the UL BWP for the first beam.

13. The method of claim 12, wherein the initial access is performed without receiving BWP switching instructions from the satellite.

14. The method of claim 10, wherein the communicating comprises:
   receiving DL transmissions from the satellite via the DL BWP for the first beam.

15. The method of claim 14, wherein the DL transmissions include system information for a wireless network associated with the satellite.

16. The method of claim 14, wherein the DL transmissions indicate at least one of a common search space or a paging search space.

17. The method of claim 10, further comprising:
detecting a second SSB transmitted by the satellite via a second beam;
determining one or more wireless communication parameters associated with the second beam; and
generating a second mapping between the second SSB and the one or more wireless communication parameters associated with the second beam.

18. The method of claim 17, wherein the one or more wireless communication parameters associated with the second beam are different than the one or more wireless communication parameters associated with the first beam.

19. The method of claim 18, wherein the one or more wireless communication parameters associated with the second beam includes a UL BWP or a DL BWP for the second beam.

20. The method of claim 19, further comprising:
detecting a change in SSB from the first SSB to the second SSB;
determining that a beam switch has occurred, from the first beam to the second beam, based at least in part on the change in SSB; and
switching communications with the satellite, based on the second mapping, to the UL BWP or the DL BWP for the second beam responsive to determining that the beam switch has occurred.

21. The method of claim 20, wherein the change in SSB is detected based at least in part on changes in a transmission configuration indicator (TCI).

22. The method of claim 21, wherein the changes in the TCI include changes to a quasi-colocation (QCL) type.

23. The method of claim 20, wherein the change in SSB is detected based at least in part on changes in spatial relation information (SRI).

24. The method of claim 19, further comprising:
determining that a BWP switch has occurred from the UL BWP or the DL BWP for the first beam to the UL BWP or the DL BWP for the second beam; and
implementing a change in SSB from the first SSB to the second SSB responsive to determining that the BWP switch has occurred.

25. The method of claim 24, wherein the change in SSB is implemented via changes in SRI.

26. The method of claim 1, further comprising:
detecting changes to the one or more wireless communication parameters associated with the first beam; and
updating the mapping based on the changes to the one or more wireless communication parameters.

27. The method of claim 26, wherein the detecting of the changes comprises:
receiving SIB updates or paging from the satellite via the first beam, the changes to the one or more wireless communication parameters being detected based on the received SIB updates or paging.

28. The method of claim 1, further comprising:
detecting a second SSB transmitted by the satellite via a second beam;
determining that the second beam shares the one or more communication parameters associated with the first beam; and
mapping the second SSB to the one or more wireless communication parameters associated with the first beam.

29. A wireless communication device comprising:
one or more processors; and
a memory coupled to the one or more processors and including instructions that, when executed by the one or more processors, cause the wireless communication device to:
detect a first synchronization signal block (SSB) transmitted by a satellite via a first beam;
determine one or more wireless communication parameters associated with the first beam;
generate a first mapping between the first SSB and the one or more wireless communication parameters associated with the first beam; and
communicate with the satellite based at least in part on the first mapping.

30. The wireless communication device of claim 29, wherein the first mapping includes a frequency index or a time index associated with the first SSB.

31. The wireless communication device of claim 30, wherein the first SSB is frequency-multiplexed with other SSBs transmitted by the satellite, execution of the instructions for generating the first mapping causing the wireless communication device to:
determine the frequency index based on a frequency on which the first SSB is detected; and
map the frequency index to the one or more wireless communication parameters associated with the first beam.

32. The wireless communication device of claim 30, wherein the first SSB is time-multiplexed with other SSBs transmitted by the satellite, execution of the instructions for generating the first mapping causing the wireless communication device to:
determine the time index based on a time at which the first SSB is detected; and
map the time index to the one or more wireless communication parameters associated with the first beam.

33. The wireless communication device of claim 29, wherein the one or more wireless communication parameters comprise beam-specific communication parameters.

34. The wireless communication device of claim 29, wherein execution of the instructions for determining the one or more wireless communication parameters causes the wireless communication device to:
receive a master information block (MIB) and one or more a system information blocks (SIBs) from the satellite via the first beam, the one or more wireless communication parameters being determined based at least in part on the received MIB or the one or more SIBs.

35. The wireless communication device of claim 34, wherein the one or more wireless communication parameters include one or more physical random-access channel (PRACH) parameters for the first beam.

36. The wireless communication device of claim 34, wherein the one or more wireless communication parameters include one or more timers or delay-specific configurations.

37. The wireless communication device of claim 34, wherein the wireless one or more communication parameters are determined from a plurality of different SIB s received form the satellite.

38. The wireless communication device of claim 34, wherein the one or more wireless communication parameters includes at least one of an uplink (UL) bandwidth part (BWP) or downlink (DL) BWP for the first beam.

39. The wireless communication device of claim 38, wherein at least one of the UL BWP or the DL BWP comprises a default BWP to be used for UL or DL communications, respectively, after an active BWP has been inactive for a threshold duration.

40. The wireless communication device of claim 38, wherein execution of the instructions for communicating with the satellite causes the wireless communication device to:
access the satellite, initially, via the UL BWP for the first beam.

41. The wireless communication device of claim 40, wherein the initial access is performed without receiving BWP switching instructions from the satellite.

42. The wireless communication device of claim 38, wherein execution of the instructions for communicating with the satellite causes the wireless communication device to:
receive DL transmissions from the satellite via the DL BWP for the first beam.

43. The wireless communication device of claim 42, wherein the DL transmissions include system information for a wireless network associated with the satellite.

44. The wireless communication device of claim 42, wherein the DL transmissions indicate at least one of a common search space or a paging search space.

45. The wireless communication device of claim 38, wherein execution of the instructions further causes the wireless communication device to:
detect a second SSB transmitted by the satellite via a second beam;
determine one or more wireless communication parameters associated with the second beam; and
generate a second mapping between the second SSB and the one or more wireless communication parameters associated with the second beam.

46. The wireless communication device of claim 45, wherein the one or more wireless communication parameters associated with the second beam are different than the one or more wireless communication parameters associated with the first beam.

47. The wireless communication device of claim 46, wherein the one or more wireless communication parameters associated with the second beam includes a UL BWP or a DL BWP for the second beam.

48. The wireless communication device of claim 47, wherein execution of the instructions further causes the wireless communication device to:
detect a change in SSB from the first SSB to the second SSB;
determine that a beam switch has occurred, from the first beam to the second beam, based at least in part on the change in SSB; and
switch communications with the satellite, based on the second mapping, to the UL BWP or the DL BWP for the second beam responsive to determining that the beam switch has occurred.

49. The wireless communication device of claim 48, wherein the change in SSB is detected based at least in part on changes in a transmission configuration indicator (TCI).

50. The wireless communication device of claim 49, wherein the changes in the TCI include changes to a quasi-colocation (QCL) type.

51. The wireless communication device of claim 48, wherein the change in SSB is detected based at least in part on changes in spatial relation information (SRI).

52. The wireless communication device of claim 47, wherein execution of the instructions further causes the wireless communication device to:
determine that a BWP switch has occurred from the UL BWP or the DL BWP for the first beam to the UL BWP or the DL BWP for the second beam; and
implement a change in SSB from the first SSB to the second SSB responsive to determining that the BWP switch has occurred.

53. The wireless communication device of claim 52, wherein the change in SSB is implemented via changes in SRI.

54. The wireless communication device of claim 29, wherein execution of the instructions further causes the wireless communication device to:
detect changes to the one or more wireless communication parameters associated with the first beam; and
update the mapping based on the changes to the one or more wireless communication parameters.

55. The wireless communication device of claim 54, wherein execution of the instructions for detecting the changes to the one or more wireless communication parameters causes the wireless communication device to:
receive SIB updates or paging from the satellite via the first beam, the changes to the one or more wireless communication parameters being detected based on the received SIB updates or paging.

56. The wireless communication device of claim 29, wherein execution of the instructions further causes the wireless communication device to:
detect a second SSB transmitted by the satellite via a second beam;
determine that the second beam shares the one or more communication parameters associated with the first beam; and
map the second SSB to the one or more wireless communication parameters associated with the first beam.

57. A wireless communication device comprising:
means for detecting a first synchronization signal block (SSB) transmitted by a satellite via a first beam;
means for determining one or more wireless communication parameters associated with the first beam;
means for generating a first mapping between the first SSB and the one or more wireless communication parameters associated with the first beam; and
means for communicating with the satellite based at least in part on the first mapping.

58. A non-transitory computer-readable memory comprising instructions that, when executed by one or more processors of a wireless communication device, cause the wireless communication device to:
detect a first synchronization signal block (SSB) transmitted by a satellite via a first beam;
determine one or more wireless communication parameters associated with the first beam;
generate a first mapping between the first SSB and the one or more wireless communication parameters associated with the first beam; and
communicate with the satellite based at least in part on the first mapping.

* * * * *